US011625210B2

(12) United States Patent
Antony

(10) Patent No.: US 11,625,210 B2
(45) Date of Patent: Apr. 11, 2023

(54) RESTAURANT-BASED POINT OF SALES SYSTEM TO ENABLE REMOTE PRINTING BY USING A HYBRID-CLOUD APPLICATION

(71) Applicant: Sapaad Inc., San Francisco, CA (US)

(72) Inventor: Anup Thomas Antony, Dubai (AE)

(73) Assignee: Sapaad Inc., San Francisco, CA (US)

(*) Notice: Subject to any disclaimer, the term of this patent is extended or adjusted under 35 U.S.C. 154(b) by 0 days.

(21) Appl. No.: 17/236,154

(22) Filed: Apr. 21, 2021

(65) Prior Publication Data

US 2022/0342620 A1    Oct. 27, 2022

(51) Int. Cl.
*G06F 3/12* (2006.01)
*G06Q 50/12* (2012.01)
*G06Q 20/20* (2012.01)

(52) U.S. Cl.
CPC .......... *G06F 3/1288* (2013.01); *G06F 3/1204* (2013.01); *G06F 3/126* (2013.01); *G06F 3/1287* (2013.01); *G06Q 20/202* (2013.01); *G06Q 20/209* (2013.01); *G06Q 50/12* (2013.01)

(58) Field of Classification Search
CPC ...... G06F 3/1288; G06F 3/1204; G06F 3/126; G06F 3/1287; G06Q 20/202; G06Q 20/209; G06Q 50/12
USPC ........................................................ 358/1.15
See application file for complete search history.

(56) References Cited

U.S. PATENT DOCUMENTS

| 9,588,721 | B2 * | 3/2017 | Takasu | G06F 3/1207 |
|---|---|---|---|---|
| 10,943,311 | B1 * | 3/2021 | Svenson | G06Q 30/0601 |
| 2006/0044595 | A1 * | 3/2006 | Ferlitsch | H04N 1/0096 358/1.15 |
| 2017/0161851 | A1 * | 6/2017 | Li | H04W 4/14 |
| 2020/0027176 | A1 * | 1/2020 | Jack | G06Q 10/087 |
| 2020/0043107 | A1 * | 2/2020 | Bertness | G06Q 30/0635 |
| 2020/0249660 | A1 * | 8/2020 | Rao | G05B 19/41865 |
| 2021/0192477 | A1 * | 6/2021 | Barman | G06F 16/954 |
| 2021/0342960 | A1 * | 11/2021 | Bridge | G06Q 30/0226 |

OTHER PUBLICATIONS

WIPO ISA/US, International Search Report and Written Opinion issued in corresponding international application, PCT/US2022/023823, dated Apr. 28, 2022, 9 pages.

* cited by examiner

*Primary Examiner* — Neil R McLean
(74) *Attorney, Agent, or Firm* — J. Peter Paredes; Amin Talati Wasserman LLP

(57) ABSTRACT

The present invention discloses a restaurant-based point of sales system. The restaurant-based point of sales system mainly comprises a cloud-based point of sales system, a cloud-based print service system and a hybrid-cloud application. Here, the cloud-based point of sales system is configured to record an order whenever a diner orders food at a restaurant. The cloud-based print service system is configured to generate one or more print orders based on the recorded diner orders. The hybrid-cloud application is installed on an end user device implemented in a restaurant to communicate with a cloud-based print service system to facilitate remote printing in parallel for every transaction. The hybrid-cloud application maintains routing rules to check one or more printers available on the local network and to print invoice/bill, one or more items at different printers in one or more kitchen stations in parallel for every transaction.

4 Claims, 1 Drawing Sheet

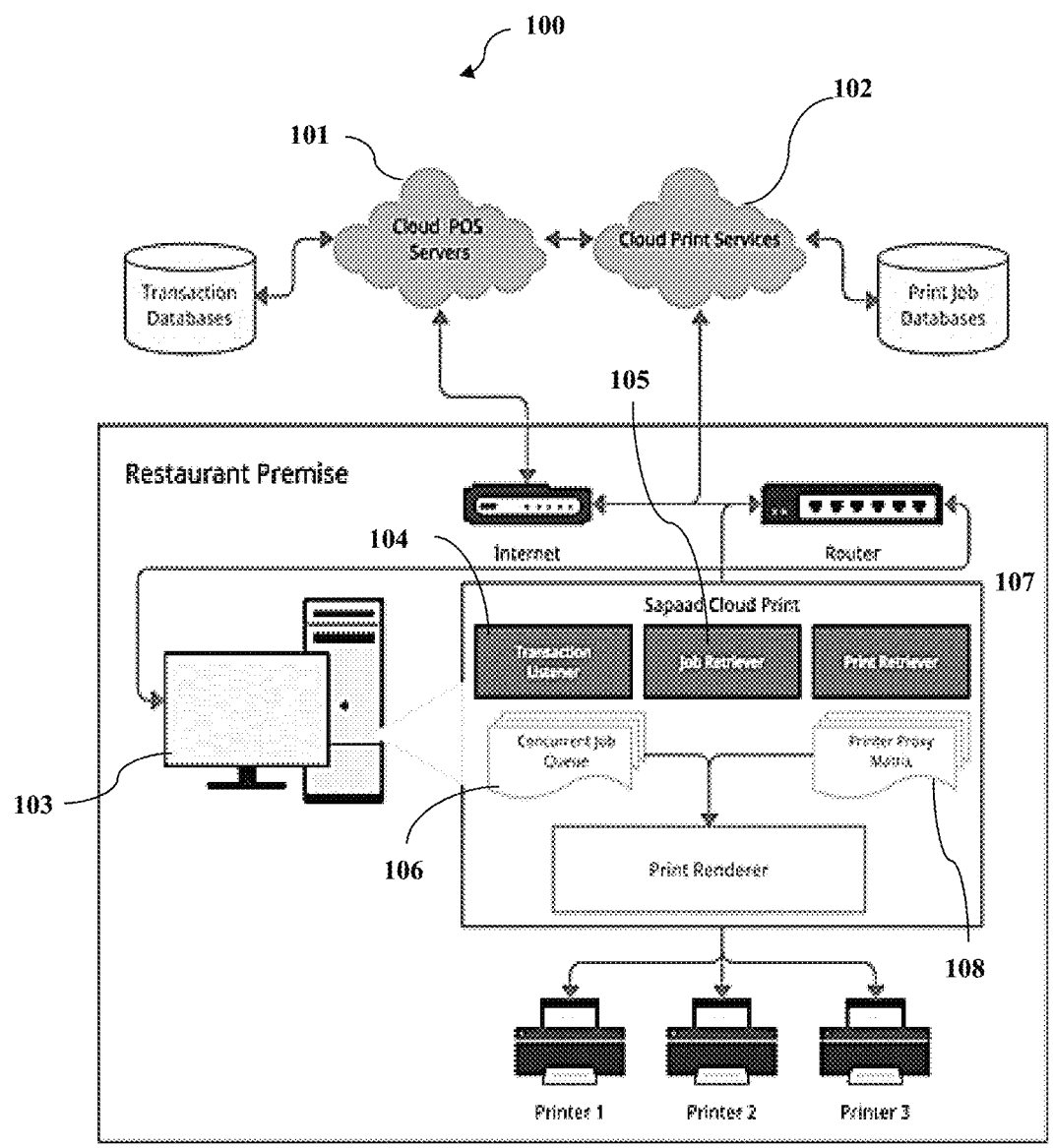

RESTAURANT-BASED POINT OF SALES SYSTEM TO ENABLE REMOTE PRINTING BY USING A HYBRID-CLOUD APPLICATION

TECHNICAL FIELD OF THE INVENTION

The present invention relates to a restaurant-based point of sales system. In particular, the present invention relates to a hybrid-cloud application implemented on a local computer in a food and beverage industry to maintain routing rules to check one or more printers available on the local network and to print invoice/bill, one or more items at different printers in the kitchen stations in parallel for every transaction.

BACKGROUND OF THE INVENTION

The management of a restaurant which involves taking orders, tracking orders, billing accurately and appropriately and checking and tracking inventory shipment, among many other restaurant related tasks, can be challenging. However, with the increased availability and functionality of several technological devices, several systems have been developed to automate such tasks and enable additional tasks that are not only beneficial to the restaurants but also the customers. For example, several systems have also been developed specifically to facilitate the remote entry of food orders from quick service restaurants through use of handheld devices. Thus, in a typical restaurant-based point of sales system whenever a diner orders food at a restaurant the order is recorded.

Further, as soon as the order is recorded several prints must be made immediately. For example, the invoice/bill of the diner's order must be printed. At the same time, the items in the order must be grouped into categories and each category must be printed at different printers in different kitchen stations. Here, the order has to be split up and send to different kitchen stations. For example, the grill items on the order is send to grill station and the salad items on the order is send to starter station. Here, the point of sales (POS) system must register with one or more printers available in the food and beverage industry. The POS must maintain routing rules to dictate where the orders are to be printed and then issues prints to the various printers available in parallel whenever an order is placed by the diner.

The US Patent Publication Number US20170161851A1 entitled "Restaurant Notification System" discloses about a restaurant management system. The restaurant management system comprises a management tablet computer for receiving a touch-based user input. The restaurant management system comprises a coordinating server for receiving an instruction from the management console and for sending a message with destination information based on the instructions. A message queueing server receives the message from the coordinating server, evaluates the destination information of the message and forwards the message to at least one destination. The message queuing server further comprises a plurality of messaging queues and a smartwatch for receiving the message from the message queueing server.

Thus, in order to group the items into categories and to print each category at different printers in different kitchen stations a cloud-based POS system was introduced. The cloud-based POS system is capable of issuing prints to multiple printers available in the food and beverage industry. However, the cloud-based POS system has limited printing capabilities and is unable to issue print to multiple printers at the same time as web browsers can only target a single printer with each print command.

Hence, there exists a need for a restaurant-based point of sales system that uses a hybrid-cloud application implemented in a local computer to maintain routing rules to check one or more printers available on the local network and to print invoice/bill, one or more items at different printers in the kitchen stations in parallel for every transaction.

SUMMARY OF THE INVENTION

The present invention encompasses a restaurant-based point of sales system comprising of a cloud-based point of sales system configured to record an order whenever a diner orders food at a restaurant. The system also comprises of a cloud-based print service system configured to generate one or more print orders based on the recorded diner orders. Here, each of the print order comprises of invoice/bill details of the diner's order, and one or more items grouped into categories pertaining to the recorded diner's order.

The system also comprises of a hybrid-cloud application installed on an end user device implemented in a restaurant to communicate with a cloud-based print service system to facilitate remote printing in parallel for every transaction. The hybrid-cloud application maintains routing rules to check one or more printers available on the local network and to print invoice/bill, one or more items at different printers in one or more kitchen stations in parallel for every transaction.

In an embodiment, the hybrid-cloud application installed on the end user device further comprises a listener component that uses web-sockets to listen to the cloud-based point of sales system for at least one transaction. The listener component is alerted within 45 milli-seconds whenever a transaction is recorded in the cloud-based point of sales system. A print job retriever component is used to communicate with the cloud-based print service system to retrieve a list of print orders to be printed for the recorded transaction and queues them using concurrent print job queue component. The system also comprises the concurrent print job queue component to queue the job retrieved by the print job retriever component.

In an embodiment, the system comprises a print retriever component to communicate with the cloud-based print service system to retrieve the content of the invoice/items to be printed. A print renderer component is used to render the retrieved print using an HTML renderer, and a print issuer component is used to issue print to the appropriate printer as defined in the concurrent print job queue component.

Thus, the restaurant-based point of sales system uses a hybrid-cloud application implemented in an end user device in a restaurant implemented in a local computer to overcome the drawbacks associated with the cloud-based POS system. The hybrid-cloud application also maintains routing rules to check one or more printers available on the local network and to print invoice/bill, one or more items at different printers in the kitchen stations in parallel for every transaction.

BRIEF DESCRIPTION OF DRAWINGS

FIG. 1 illustrates a restaurant-based point of sales system, according to one embodiment of the present invention.

DETAILED DESCRIPTION OF THE INVENTION

In order to make the matter of the invention clear and concise, the following definitions are provided for specific terms used in the following description.

The term "end user device" refers to at least any one of a laptop, a tablet device, a desktop, a mobile phone, a personal digital assistant (PDA) or any electronic device that is capable of providing two way communication with a cloud-based print service system to facilitate remote printing in parallel for every transaction in a restaurant.

FIG. 1 illustrates a restaurant-based point of sales system, according to one embodiment of the present invention.

As exemplarily illustrated in FIG. 1, the restaurant-based point of sales system (100) comprises a cloud-based point of sales system (101) configured to record an order whenever a diner orders food at a restaurant. The system (100) also comprises a cloud-based print service system (102) configured to generate one or more print orders based on the recorded diner orders. Here, each of the print order comprises invoice/bill details of the diner's order, and one or more items grouped into categories pertaining to the recorded diner's order.

The system (100) also comprises a hybrid-cloud application installed on an end user device (103) implemented in a restaurant to communicate with a cloud-based print service system (102) to facilitate remote printing in parallel for every transaction. The hybrid-cloud application maintains routing rules to check one or more printers available on the local network. The hybrid-cloud application also prints invoice/bill, one or more items at different printers in one or more kitchen stations in parallel for every transaction.

In an embodiment, the hybrid-cloud application installed on the end user device (103) further comprises a listener component (104) that uses web-sockets to listen to the cloud-based point of sales system for at least one transaction. The listener component (104) is alerted within 45 milli-seconds whenever a transaction is recorded in the cloud-based point of sales system (101). A print job retriever component (105) is used to communicate with the cloud-based print service system to retrieve a list of print orders to be printed for the recorded transaction and queues them using concurrent print job queue component (106). The system (100) also comprises the concurrent print job queue component (106) to queue the job retrieved by the print job retriever component (105).

In an embodiment, the system (100) comprises a print retriever component (107) to communicate with the cloud-based print service system (102) to retrieve the content of the invoice/items to be printed. A print renderer component (108) is used to render the retrieved print using an HTML renderer, and a print issuer component is used to issue print to the appropriate printer as defined in the concurrent print job queue component. For example, the grill items on the order is printed on a printer located at a grill station, and the salad items on the order is printed on a printer located at a starter station.

Thus, the restaurant-based point of sales system (100) uses a hybrid-cloud application implemented on an end user device (103) in a restaurant implemented in a local computer to overcome the drawbacks associated with the cloud-based POS system. The hybrid-cloud application also maintains routing rules to check one or more printers available on the local network and to print invoice/bill, one or more items at different printers in the kitchen stations in parallel for every transaction.

System

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Software includes applications and algorithms. Software may be implemented in a smart phone, tablet, or personal computer, in the cloud, on a wearable device, or other computing or processing device. Software may include logs, journals, tables, games, recordings, communications, SMS messages, Web sites, charts, interactive tools, social networks, VOIP (Voice Over Internet Protocol), e-mails, and videos.

In some embodiments, some or all of the functions or process(es) described herein and performed by a computer program that is formed from computer readable program code and that is embodied in a computer readable medium. The phrase "computer readable program code" includes any type of computer code, including source code, object code, executable code, firmware, software, etc. The phrase "computer readable medium" includes any type of medium capable of being accessed by a computer, such as read only memory (ROM), random access memory (RAM), a hard disk drive, a compact disc (CD), a digital video disc (DVD), or any other type of memory.

All publications and patent applications mentioned in this specification are herein incorporated by reference to the same extent as if each individual publication or patent application was specifically and individually indicated to be incorporated by reference.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A restaurant-based point of sales system, wherein the system comprises:
   i. a hybrid-cloud application installed on the end user device implemented in a restaurant to communicate with a cloud-based print service system to facilitate remote printing in parallel for every recorded transaction, wherein the hybrid-cloud application further comprises:
      a) a listener component that uses web-sockets to listen to the cloud-based point of sales system for at least one transaction, wherein the listener component is alerted within 45 milli-seconds whenever the transaction is recorded in the cloud-based point of sales system;
      b) a print job retriever component to communicate with the cloud-based print service system to retrieve the list of print orders to be printed for the recorded transaction and queues them using a concurrent print job queue component;
      c) a print retriever component to communicate with the cloud-based print service system to retrieve the content of the invoice/items to be printed;
      d) a print renderer component to render the retrieved print using an HTML, renderer; and
      e) a print issuer component to issue the print to the appropriate printer as defined in the concurrent print job queue component.

2. The system as claimed in claim 1, wherein the concurrent print job queue component queues the job retrieved by the print job retriever component.

3. A restaurant-based point of sales system wherein the restaurant-based point of sales system comprises:
   a cloud-based point of sales system configured to record an order whenever a diner orders food at a restaurant;
   a cloud-based print service system configured to generate one or more print orders based on a recorded transaction of the diner's orders, wherein each of the print order comprises:
   an invoice/bill details of the diner's order;
   one or more items grouped into categories pertaining to the recorded diner's order; and
   a hybrid-cloud application installed on an end user device implemented in a restaurant to communicate with the cloud-based print service system to facilitate a remote printing in parallel for every recorded transaction, wherein the hybrid-cloud application maintains routing rules to check one or more printers available on the local network and to print the invoice/bill and one or more items pertaining to the diner's order at different printers in one or more kitchen stations in parallel for every transaction;
   the hybrid-cloud application installed on the end user device further comprises:
      a listener component that uses web-sockets to listen to the cloud-based point of sales system for at least one transaction, wherein the listener component is alerted within 45 milli-seconds whenever the transaction is recorded in the cloud-based point of sales system;
      a print job retriever component to communicate with the cloud-based print service system to retrieve the list of print orders to be printed for the recorded transaction and queues them using a concurrent print job queue component;
      a print retriever component to communicate with the cloud-based print service system to retrieve the content of the invoice/items to be printed;
      a print renderer component to render the retrieved print using an HTML, renderer; and
      a print issuer component to issue the print to the appropriate printer as defined in the concurrent print job queue component.

4. The system as claimed in claim 3, wherein the concurrent print job queue component queues the job retrieved by the print job retriever component.

* * * * *